(12) United States Patent
Zhang et al.

(10) Patent No.: US 10,709,961 B2
(45) Date of Patent: Jul. 14, 2020

(54) POWER-DRIVEN SHOE DEVICE

(71) Applicant: Nimbus Robotics, Inc., Pittsburgh, PA (US)

(72) Inventors: Jiancheng Zhang, JiangBei NingBo (CN); Bojie Xu, JiangBei NingBo (CN); Jianjun Li, JiangBei NingBo (CN); Dongliang Song, JiangBei NingBo (CN)

(73) Assignee: Nimbus Robotics, Inc., Pittsburgh, PA (US)

( * ) Notice: Subject to any disclaimer, the term of this patent is extended or adjusted under 35 U.S.C. 154(b) by 0 days.

(21) Appl. No.: 16/346,851

(22) PCT Filed: Aug. 3, 2017

(86) PCT No.: PCT/CN2017/000499
§ 371 (c)(1),
(2) Date: May 1, 2019

(87) PCT Pub. No.: WO2018/082192
PCT Pub. Date: May 11, 2018

(65) Prior Publication Data
US 2019/0314710 A1 Oct. 17, 2019

(30) Foreign Application Priority Data
Nov. 1, 2016 (CN) .................... 2016 2 1160367 U

(51) Int. Cl.
*A63C 17/12* (2006.01)
*A63C 17/04* (2006.01)
*A63C 17/22* (2006.01)
*F16H 3/66* (2006.01)

(52) U.S. Cl.
CPC .............. *A63C 17/12* (2013.01); *A63C 17/04* (2013.01); *A63C 17/226* (2013.01); *F16H 3/66* (2013.01)

(58) Field of Classification Search
CPC .................................................. A63C 17/12
See application file for complete search history.

(56) References Cited

U.S. PATENT DOCUMENTS

| | | | | |
|---|---|---|---|---|
| 833,100 A | * | 10/1906 | Wells | A63C 17/12 280/11.115 |
| 1,672,700 A | * | 6/1928 | Gabor | A63C 17/02 280/11.31 |
| 2,857,008 A | * | 10/1958 | Pirrello | A63C 17/12 180/181 |

(Continued)

*Primary Examiner* — Erez Gurari
(74) *Attorney, Agent, or Firm* — Michael G. Monyok

(57) ABSTRACT

Disclosed is a power-driven shoe device, comprising a shoe sole (1), wherein a plurality of rotating wheels (2) are arranged below the shoe sole (1); an electric motor (3) is further provided at a lower part of the shoe sole (1); an output end of the electric motor (3) is connected to a transmission device; the transmission device is in driving connection with the rotating wheels (2); rotating wheel brackets (6) for having the rotating wheels (2) mounted thereon are arranged on two sides of a lower side surface of the shoe sole (1); and the transmission device comprises a driving wheel (4), a multistage deceleration structure and a planetary speed reducer, the multistage deceleration structure being disposed, in a lengthwise direction of the shoe sole (1), on the rotating wheel brackets (6).

9 Claims, 1 Drawing Sheet

(56) References Cited

U.S. PATENT DOCUMENTS

| | | | | |
|---|---|---|---|---|
| 3,392,986 A * | 7/1968 | Ryan | A63C 17/12 | 280/11.115 |
| 4,417,737 A * | 11/1983 | Suroff | A63C 17/12 | 280/11.115 |
| 5,056,802 A * | 10/1991 | Piotrowski | A63C 17/12 | 280/11.115 |
| 5,236,058 A * | 8/1993 | Yamet | A63C 17/12 | 180/181 |
| 5,797,466 A * | 8/1998 | Gendle | A63C 17/265 | 180/181 |
| 6,059,062 A * | 5/2000 | Staelin | A63C 17/12 | 180/181 |
| 7,163,210 B1 * | 1/2007 | Rehkemper | A63C 17/12 | 280/11.221 |
| 7,204,330 B1 * | 4/2007 | Lauren | A63C 17/12 | 180/181 |
| 9,925,453 B1 * | 3/2018 | Tuli | A43B 3/0005 | |
| 10,456,698 B2 * | 10/2019 | Chen | A63H 19/10 | |
| 2001/0022433 A1 * | 9/2001 | Chang | A43B 5/1633 | 280/11.19 |
| 2003/0047893 A1 * | 3/2003 | Pahis | A63C 17/12 | 280/11.115 |
| 2003/0141124 A1 * | 7/2003 | Mullet | A63C 17/12 | 180/181 |
| 2004/0239056 A1 * | 12/2004 | Cho | A63C 17/008 | 280/7.1 |
| 2005/0046139 A1 * | 3/2005 | Guan | A63C 17/12 | 280/221 |
| 2006/0027409 A1 * | 2/2006 | Adams | A63C 17/008 | 180/181 |
| 2007/0090613 A1 * | 4/2007 | Lyden | A63C 17/02 | 280/11.221 |
| 2007/0273110 A1 * | 11/2007 | Brunner | A63C 17/12 | 280/11.115 |
| 2009/0120705 A1 * | 5/2009 | McKinzie | A63C 17/008 | 180/181 |
| 2017/0182397 A1 * | 6/2017 | Zhang | A63C 17/12 | |
| 2019/0314710 A1 * | 10/2019 | Zhang | A63C 17/04 | |
| 2019/0351315 A1 * | 11/2019 | Li | A63C 17/08 | |
| 2020/0061444 A1 * | 2/2020 | Zhang | A63C 17/0006 | |

* cited by examiner

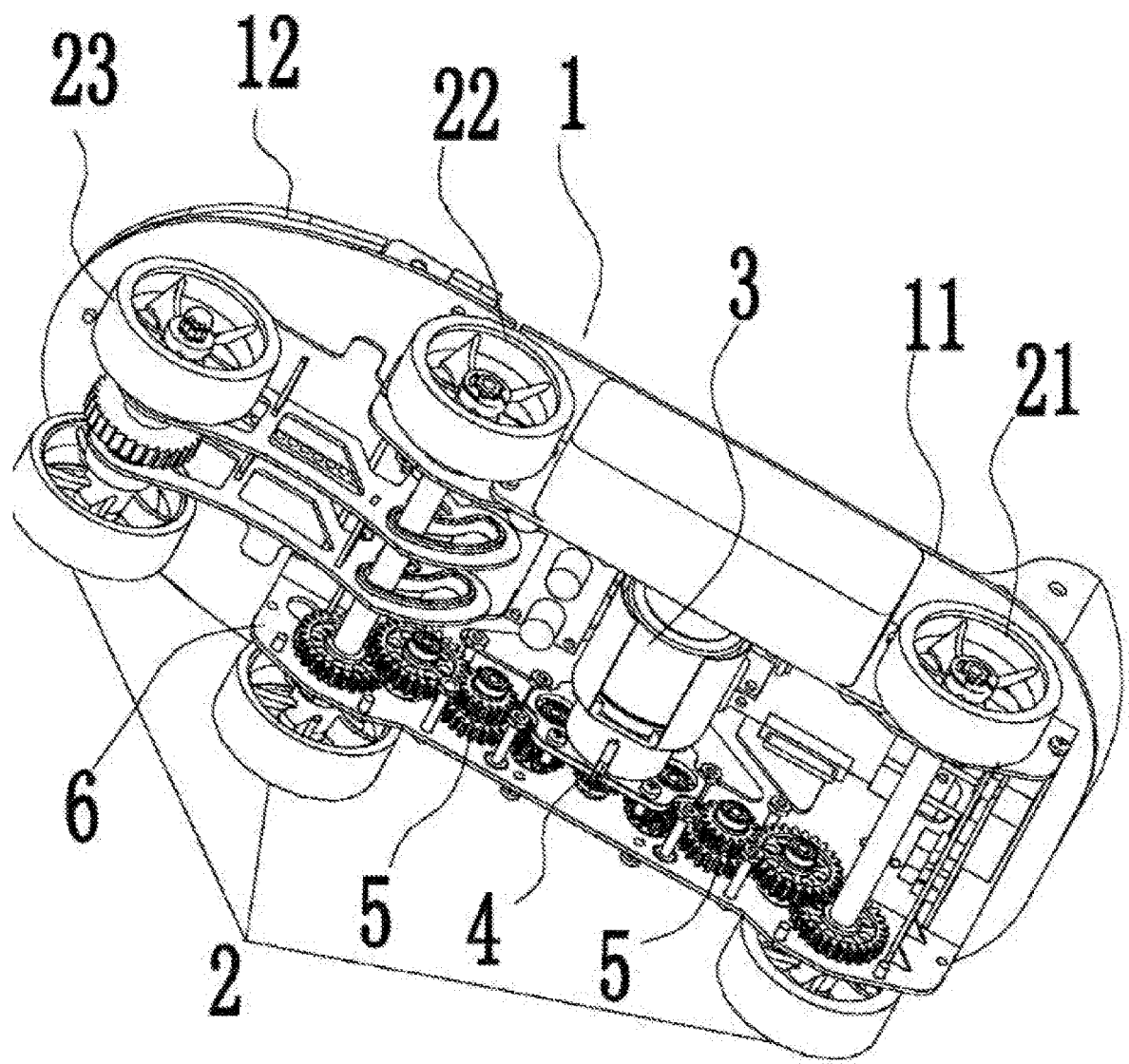

POWER-DRIVEN SHOE DEVICE

TECHNICAL FIELD

The present invention relates to the technical field of transportation tools, and more particularly relates to power shoe devices.

BACKGROUND ART

With the further growth of the urban population, traffic jam has become the nuisance of every main city. Although public transportation is a very effective solution to the traffic jam, a last kilometer problem, that is, a relatively long final walking distance, still remains, which is one of the factors hindering the building of a perfect bus system. Traditional roller skates can solve the above-mentioned problem to a certain extent, and there are various electric transportation tools on the market, such as electric roller skates appearing recently, which are the solutions to the last kilometer problem.

However, the existing electric roller skates have one problem that: an enough space must be reserved between shoe soles and the ground because transmission structures are not small enough, resulting in a relatively long distance between vamps and the ground; and furthermore, the wheel tread is relatively small, so that the stability is extremely low, and only those who are skilled at roller skating can use the electric roller skates successfully. If the wheel tread is increased, two feet would collide with each other to cause falling over during walking due to extremely wide vamps, so that the electric roller skates are very unsafe to use on the road.

SUMMARY OF THE UTILITY MODEL

In view of the shortcomings in the prior art, the present utility model provides power shoe devices, the vamps of which are relatively close to the ground to achieve high stability.

In order to solve the above-mentioned problem, the present utility model provides the following technical solution: power shoe devices, each of which includes a shoe sole. A plurality of rotating wheels are disposed below the shoe sole, and a motor is further disposed at the lower part of the shoe sole; and the output end of the motor is connected with a transmission device which is in driving connection with the rotating wheels. Each power shoe device is characterized in that rotating wheel racks for mounting the rotating wheels are disposed on two sides of the lower side surface of the shoe sole. The transmission device includes a driving wheel and multiple stages of speed reduction structures which are disposed on the rotating wheel racks along the lengthwise direction of the shoe sole.

According to the present utility model, the fixedly disposed multi-stage speed reduction structures provided by the rotating wheel racks provide an installation space, so that multi-stage speed reduction can be implemented in a relatively flat space. The multi-stage speed reduction structures effectively reduce the volume of the transmission device, and particularly reduce the size of the transmission device in a vertical direction, thereby effectively shortening the distance between the vamps and the ground to achieve higher stability of the present invention.

Preferably, the multi-stage speed reduction structures are speed reduction gear sets.

In order to achieve a better technical effect, a further technical measure includes that: the speed reduction gear sets are all mounted on the inner side surfaces of the rotating wheel racks, and gears in the speed reduction gear sets are located on the same straight line. When the speed reduction gear sets are located on the inner sides of the rotating wheel racks, the rotating wheel racks can achieve a good protective effect on the speed reduction gear sets. In addition, the gears in the speed reduction gear sets are located on the same straight line, so that the speed reduction gear sets occupy a reduced space in the vertical direction to further ensure that the distance between the vamps and the ground is relatively short.

The transmission device further includes a planetary speed reducer which is connected with the motor.

According to one solution, the rotating wheels at least include a first rotating wheel group and a second rotating wheel group, and the transmission device drives one of the rotating wheel groups.

According to another preferred solution, the rotating wheels at least include a first rotating wheel group and a second rotating wheel group. The driving wheel is located in the middle of a space between the first rotating wheel group and the second rotating wheel group. The speed reduction gear sets are symmetrically disposed on two sides of the driving wheel, so that the transmission device simultaneously drives the first rotating wheel group and the second rotating wheel group. In this solution, the front and rear groups of rotating wheels are driven at the same time, so that when the rear group of rotating wheels are lifted up, the front group of rotating wheels may still provide forward moving power.

A further improvement is that: the shoe sole consists of a shoe heel part and a shoe forefoot part. The shoe heel part and the shoe forefoot part are in rotatable connection with each other. The first rotating wheel group and the second rotating wheel group are both disposed on the shoe heel part. A third rotating wheel group is mounted on the lower side surface of the shoe forefoot part. The shoe heel part and the shoe forefoot part may rotate relatively, so that the present invention is more in line with the normal walking habit of a user.

The wheel tread of the first rotating wheel group and the wheel tread of the second rotating wheel group are adjustable, and the wheel tread of the first rotating wheel group is less than or equal to that of the second rotating wheel group. With the adjustable wheel treads, the present utility model is applicable to people of different sports demands. With wide wheel treads, it is applicable to people requiring stability. With narrow wheel treads, it is applicable to people requiring movability. In addition, the wheel tread of the first rotating wheel group is less than or equal to that of the second rotating wheel group, so that the transverse steadiness is improved, and such a phenomenon that the forefoot part of one shoe collides with the heel of the other shoe during walking due to an extremely wide wheel tread is avoided.

Compared with the prior art, the present utility model has the following beneficial effects that: the fixedly disposed multi-stage speed reduction structures provided by the rotating wheel racks provide an installation space, so that multi-stage speed reduction can be implemented in the relatively flat space. The multi-stage speed reduction structures effectively reduce the volume of the transmission device, and particularly reduce the size of the transmission device in the vertical direction, thereby effectively shortening the distance between the vamps and the ground to achieve higher stability of the present invention.

BRIEF DESCRIPTION OF THE DRAWINGS

FIG. 1 is a schematic diagram of a structure of Embodiment 1 of the present invention.

DETAILED DESCRIPTION OF THE UTILITY MODEL

A further detailed description will be made below to the present invention in combination with accompanying drawings and specific implementation modes.

Embodiment 1

With reference to FIG. 1, power shoe devices are provided, each of which includes a shoe sole 1. A plurality of rotating wheels 2 are disposed below the shoe sole 1, and a motor 3 is further disposed at the lower part of the shoe sole 1; and the output end of the motor 3 is connected with a transmission device which is in driving connection with the rotating wheels 2. Each power shoe device is characterized in that rotating wheel racks 6 for mounting the rotating wheels 2 are disposed on two sides of the lower side surface of the shoe sole 1. The transmission device includes a driving wheel 4 and multi-stage speed reduction structures which are disposed on the rotating wheel racks 6 along the lengthwise direction of the shoe sole 1. The transmission device further includes a planetary speed reducer which is connected with the motor 3.

The rotating wheel racks 6 for mounting the rotating wheels 2 are disposed on the two sides of the lower side surface of the shoe sole 1. Speed reduction gear sets 5 are all mounted on the inner side surfaces of the rotating wheel racks 6, and gears in the speed reduction gear sets 5 are located on the same straight line.

The rotating wheels 2 at least include a first rotating wheel group 21 and a second rotating wheel group 22. The driving wheel 4 is located in the middle of a space between the first rotating wheel group 21 and the second rotating wheel group 22. The speed reduction gear sets 5 are symmetrically disposed on two sides of the driving wheel 4, so that the transmission device simultaneously drives the first rotating wheel group 21 and the second rotating wheel group 22.

The shoe sole 1 consists of a shoe heel part 11 and a shoe forefoot part 12. The shoe heel part 11 and the shoe forefoot part 12 are in rotatable connection with each other. The first rotating wheel group 21 and the second rotating wheel group 22 are both disposed on the shoe heel part 11. A third rotating wheel group 23 is mounted on the lower side surface of the shoe forefoot part 12.

Embodiment 2

In this embodiment (the FIGURE is omitted), the rotating wheels 2 at least include a first rotating wheel group 21 and the second rotating wheel group 22. The wheel tread of the first rotating wheel group 21 is less than that of the second rotating wheel group 22. The transmission device drives the second rotating wheel group 22.

The rest part is the same as that of Embodiment 1, so no more details will be given herein.

In addition to the speed reduction gear sets, the multi-stage speed reduction structures in the above-mentioned embodiment may also adopt synchronous belt wheels and other speed reduction structures.

What is claimed is:

1. Power shoe devices, each of which comprises a shoe sole (1), characterized in that a plurality of rotating wheels (2) are disposed below the shoe sole (1), and a motor (3) is further disposed at the lower part of the shoe sole (1); and the output end of the motor (3) is connected with a transmission device which is in driving connection with the rotating wheels (2); rotating wheel racks (6) for mounting the rotating wheels (2) are disposed on two sides of the lower side surface of the shoe sole (1); and the transmission device comprises a driving wheel (4) and multi-stage speed reduction structures which are disposed on the rotating wheel racks (6) along the lengthwise direction of the shoe sole (1).

2. The power shoe devices according to claim 1, characterized in that the multi-stage speed reduction structures are speed reduction gear sets (5).

3. The power shoe devices according to claim 2, characterized in that the speed reduction gear sets (5) are all mounted on the inner side surfaces of the rotating wheel racks (6), and gears in the speed reduction gear sets (5) are located on the same straight line.

4. The power shoe devices according to claim 3, characterized in that the transmission device further comprises a planetary speed reducer which is connected with the motor (3).

5. The power shoe devices according to claim 4, characterized in that the rotating wheels (2) at least comprise a first rotating wheel group (21) and a second rotating wheel group (22), and the transmission device drives one of the rotating wheel groups.

6. The power shoe devices according to claim 4, characterized in that the rotating wheels (2) at least comprises a first rotating wheel group (21) and a second rotating wheel group (22); the driving wheel (4) is located in the middle of a space between the first rotating wheel group (21) and the second rotating wheel group (22); and the speed reduction gear sets (5) are symmetrically disposed on two sides of the driving wheel (4), so that the transmission device simultaneously drives the first rotating wheel group (21) and the second rotating wheel group (22).

7. The power shoe devices according to claim 5, characterized in that the shoe sole (1) consists of a shoe heel part (11) and a shoe forefoot part (12); the shoe heel part (11) and the shoe forefoot part (12) are in rotatable connection with each other; the first rotating wheel group (21) and the second rotating wheel group (22) are both disposed on the shoe heel part (11); and a third rotating wheel group (23) is mounted on the bottom of the shoe forefoot part (12).

8. The power shoe devices according to claim 7, characterized in that the wheel distance of the first rotating wheel group (21) and the wheel distance of the second rotating wheel group (22) are adjustable, and the wheel tread of the first rotating wheel group (21) is less than or equal to that of the second rotating wheel group (22).

9. The power shoe devices according to claim 6, characterized in that the shoe sole (1) consists of a shoe heel part (11) and a shoe forefoot part (12); the shoe heel part (11) and the shoe forefoot part (12) are in rotatable connection with each other; the first rotating wheel group (21) and the second rotating wheel group (22) are both disposed on the shoe heel part (11); and a third rotating wheel group (23) is mounted on the bottom of the shoe forefoot part (12).

* * * * *